United States Patent
Klinkig et al.

(10) Patent No.: US 9,441,600 B2
(45) Date of Patent: Sep. 13, 2016

(54) MOTOR VEHICLE ELECTRICAL SYSTEM AND METHOD FOR OPERATING A MOTOR VEHICLE ELECTRICAL SYSTEM

(75) Inventors: Andreas Klinkig, Cremlingen (DE); Rainer Fleischer, Wolfsburg (DE)

(73) Assignee: VOLKSWAGEN AG, Wolfsburg (DE)

(*) Notice: Subject to any disclaimer, the term of this patent is extended or adjusted under 35 U.S.C. 154(b) by 533 days.

(21) Appl. No.: 14/117,451

(22) PCT Filed: Apr. 30, 2012

(86) PCT No.: PCT/EP2012/001865
§ 371 (c)(1),
(2), (4) Date: Nov. 13, 2013

(87) PCT Pub. No.: WO2012/156028
PCT Pub. Date: Nov. 22, 2012

(65) Prior Publication Data
US 2015/0084345 A1    Mar. 26, 2015

(30) Foreign Application Priority Data

May 14, 2011   (DE) .................. 10 2011 101 531

(51) Int. Cl.
*F02N 11/08*    (2006.01)
*B60R 16/03*   (2006.01)
(Continued)

(52) U.S. Cl.
CPC ........... *F02N 11/0818* (2013.01); *B60R 16/03* (2013.01); *F02N 11/08* (2013.01);
(Continued)

(58) Field of Classification Search
CPC .... B60R 16/03; F02N 11/08; F02N 11/0818; F02N 11/0866; F03D 80/88; H02J 1/08; H02J 7/1423; H02J 2001/008
USPC ....................... 307/10.6; 290/38 E
See application file for complete search history.

(56) References Cited

U.S. PATENT DOCUMENTS

| | | | | |
|---|---|---|---|---|
| 5,977,652 A | * | 11/1999 | Frey | ............... H02J 7/1423 307/10.1 |
| 6,218,643 B1 | * | 4/2001 | Iwata | .................. F01N 3/2013 219/202 |

(Continued)

FOREIGN PATENT DOCUMENTS

DE    102004036042 A1  *  2/2006  ............... H02J 1/08
DE    102008054706 A1     6/2010

(Continued)

OTHER PUBLICATIONS

Translation of Wortberg (DE 102008054885) & Bosch (DE 102004036042.).*

(Continued)

*Primary Examiner* — Rexford Barnie
*Assistant Examiner* — Elim Ortiz
(74) *Attorney, Agent, or Firm* — Barnes & Thornburg LLP

(57) ABSTRACT

A motor vehicle electrical system, wherein a control unit senses or detects a start-stop command for the internal combustion engine, wherein when a start-stop command is sensed or detected a switching element is switched into the first switching state and the voltage at the DC/DC output, which is connected to the switching element, is increased by a control unit by means of a control command, wherein a measuring unit senses and evaluates the voltage condition over the switching element, wherein depending upon the evaluation the start-stop command is or is not carried out by a control unit using a control command. Also disclosed is a method for operating a motor vehicle electrical system.

10 Claims, 1 Drawing Sheet

(51) Int. Cl.
*H02J 7/14* (2006.01)
*H02J 1/08* (2006.01)
*H02J 1/00* (2006.01)

(52) U.S. Cl.
CPC ........... *F02N11/0866* (2013.01); *F03D 80/88* (2016.05); *H02J 1/08* (2013.01); *H02J 7/1423* (2013.01); *H02J 2001/008* (2013.01)

(56) References Cited

U.S. PATENT DOCUMENTS 6,232,674 B1 * 5/2001 Frey ................... H02J 7/1423
307/10.1
2003/0160510 A1 * 8/2003 Mizutani ............. F02N 11/0814
307/10.1
2010/0181828 A1 * 7/2010 Handa ..................... B60L 7/16
307/9.1
2012/0237799 A1 * 9/2012 Jiang ................... H01M 2/1072
429/7

FOREIGN PATENT DOCUMENTS

DE 102008054885 A1 6/2010
DE 102008054885 A2 * 6/2010 ............. B60R 16/03

OTHER PUBLICATIONS

Search Report for International Patent Application No. PCT/EP2012/001865; Aug. 22, 2012.

* cited by examiner

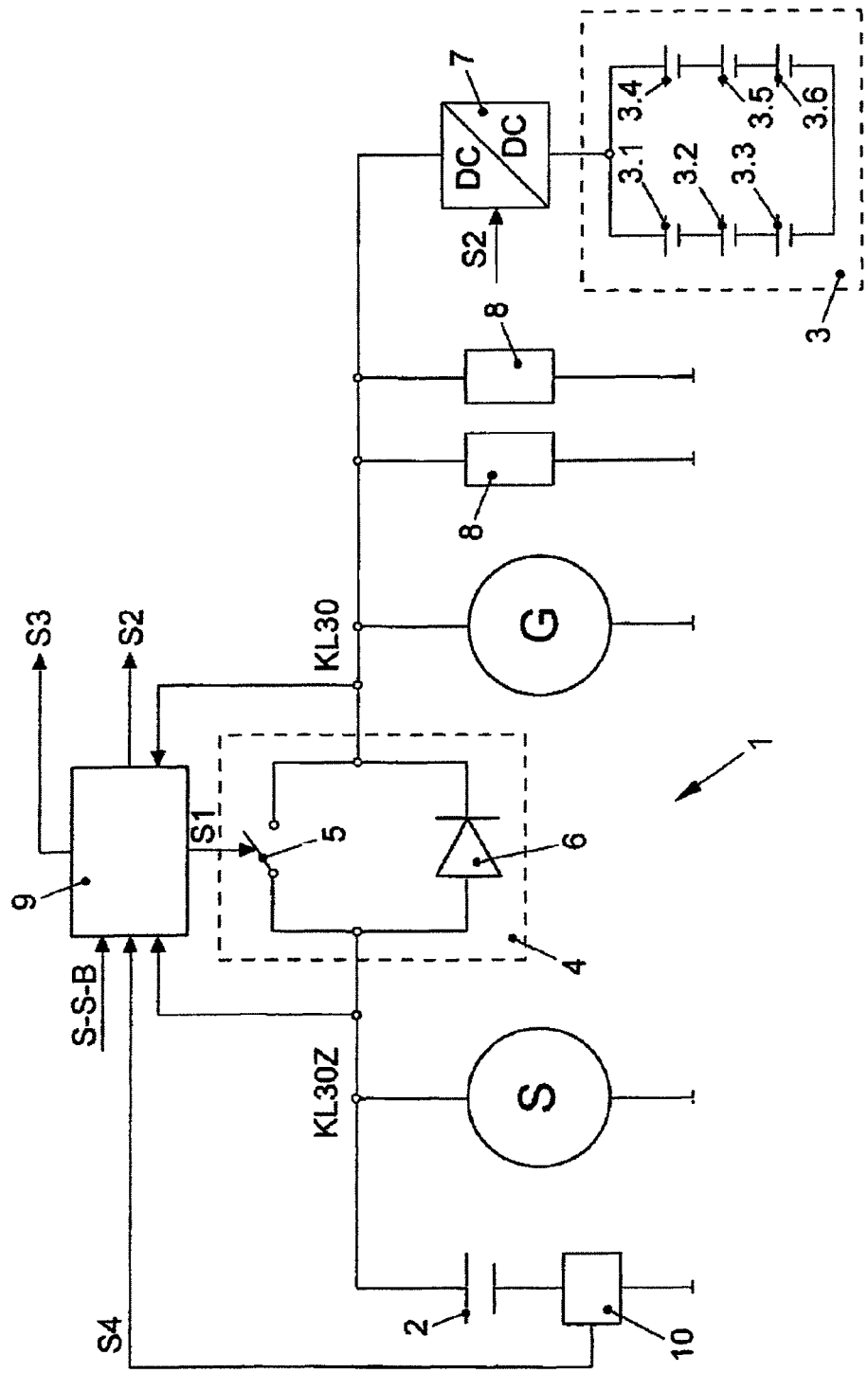

MOTOR VEHICLE ELECTRICAL SYSTEM AND METHOD FOR OPERATING A MOTOR VEHICLE ELECTRICAL SYSTEM

PRIORITY CLAIM

This patent application is a U.S. National Phase of International Patent Application No. PCT/EP2012/001865, filed 30 Apr. 2012, which claims priority to German Patent Application No. 10 2011 101 531.4, filed 14 May 2011, the disclosures of which are incorporated herein by reference in their entirety.

BACKGROUND

The present disclosure relates to a motor vehicle electrical system and to a method for operating a motor vehicle electrical system.

SUMMARY

A motor vehicle electrical system in accordance with the present disclosure includes a starter for an internal combustion engine and a first energy store. The starter and the first energy store are arranged in a first region of the motor vehicle.

BRIEF DESCRIPTION OF THE DRAWINGS

The single FIGURE shows a schematic block diagram of a motor vehicle electrical system.

DETAILED DESCRIPTION OF THE DISCLOSED EMBODIMENTS

In illustrative embodiments, the generator and second energy store are arranged in a second region of the motor vehicle electrical system. A switching element is arranged between the first and the second region of the motor vehicle electrical system and has at least two switching states. In a first switching state current flow is possible only in the direction from the first region to the second region or the current flow is interrupted in both directions. In a second switching state the first and second regions are connected-through to one another. The switching element can be actuated by at least one first associated control unit by means of a control signal.

In illustrative embodiments, the second energy store is connected to the generator via a DC/DC converter. A start-stop command (S-S-B) for the internal combustion engine can be detected or can be identified by means of the control unit. When a start/stop command (S-S-B) is detected or identified, the switching element is switched to the first switching state and the voltage at the DC/DC output, which is connected to the switching element, is increased by a control unit by means of a control command. A measurement unit detects and evaluates the voltage across the switching element. The start/stop command is executed by a control unit (9) by means of a control command (S3) or is not executed, depending on the evaluation.

In illustrative embodiments, all of the control units are integrated in a common control unit. The switching element is in the form of a power semiconductor switch, in the form of a power relay, or in the form of a power relay with a parallel diode.

In illustrative embodiments, the measurement unit detects and evaluates the voltage and/or the voltage gradient. A setpoint voltage of the second energy store (3) is greater than a setpoint voltage of the first energy store (2).

In an illustrative method in accordance with the present disclosure, the voltage is used to establish whether the switching element has been switched to the first switching state. The measurement unit detects and evaluates the voltage and/or the voltage gradient. An interruption in the first energy store or the supply line of the first energy store is detected using the voltage and/or an internal cell short-circuit and/or corrosion of a pole terminal is detected using the voltage gradient. The switching element remains in the first switching state when a defect in the starter battery is established and the start/stop command is not executed.

The present disclosure will be explained in greater detail below with reference to a preferred exemplary embodiment. The single FIGURE shows a schematic block diagram of a motor vehicle electrical system.

The motor vehicle electrical system 1 comprises a starter S for an internal combustion engine (not illustrated) and a first energy store 2 which is also termed the starter battery 2 in the text which follows. The starter S and the starter battery 2 are arranged in a first region of the motor vehicle 1. The motor vehicle electrical system 1 further comprises a generator G and a second energy store 3, which generator and second energy store are arranged in a second region of the motor vehicle electrical system 1. A switching element 4 which has at least two switching states is arranged between the first and the second region of the motor vehicle electrical system 1, wherein in a first switching state current flow is possible only in the direction from the first region to the second region, and in a second switching state the first and the second region are connected-through to one another. The switching element 4 is illustrated in the FIGURE by a switch 5 and a diode 6 which is connected in parallel and is in the form of, for example, a MOSFET which acts in a conductive manner like a closed switch 5 when it is on and acts like the diode 6 in the off-state on account of its intrinsic diode. The second energy store 3 is connected to the generator G or to the switching element 4 via a DC/DC converter 7. In this case, the rated voltage of the second energy store 3 is preferably greater than the rated voltage of the starter battery 2. The DC/DC converter 7 therefore operates in the direction of the generator as a step-down converter and in the direction of the second energy store 3 as a step-up converter. Furthermore, electrical loads 8 are arranged in the second region of the motor vehicle electrical system 1, it being possible for said electrical loads to be, for example, light sources, controllers, an electromechanical steering system and/or an electromechanical brake. In the illustrated exemplary embodiment, the second energy store 3 comprises a large number of cells 3.1-3.6, some of which are connected in parallel and some of which are connected in series, in order to realize the rated voltage at the desired capacity. Finally, the motor vehicle electrical system 1 comprises a control unit 9 which is integrated, for example, in an electrical system controller, and comprises a battery management module 10 which is situated between the starter battery 2 and ground.

During normal operation, the internal combustion engine is initially started by the starter S. The switch 5 is open in the process, as is illustrated. The running internal combustion engine then drives, amongst other things, the generator G which supplies power to the electrical system loads 8. Furthermore, the second energy store 3 is charged by means of the DC/DC converter 7 which is operated as a step-up converter. The generator G also charges the starter battery 2 by means of the switch 5 which is closed after starting.

If a start/stop process is now intended to be executed during driving, it is necessary to ensure that the turned-off internal combustion engine can be restarted. If the control unit 9 now receives a start/stop command S-S-B or itself determines a start/stop command, the switch 5 is opened by means of a control signal S1 in a first step. The voltage across the DC/DC converter 7 is increased by means of a second control command S2 from the control unit 9. The control unit 9 then compares the potentials KL30 and KL30Z with one another. Since the voltage at the output of the DC/DC converter 7 has increased, a voltage difference KL30−KL30Z=ΔU has to be produced when the switch 5 is opened, wherein ΔU ideally corresponds to the increase in voltage at the output of the DC/DC converter 7. If, however, the voltage drop is zero, this means that the switch 5 is closed, for example because the signal S1 has been disturbed or the switching element 4 is defective. Since it is not possible to start the internal combustion engine without a retroactive effect on the second region of the motor vehicle electrical system 1 when the switch 5 is closed, the control unit 9 can react, for example, as follows: a control signal S3 is generated that the start/stop command is not executed. This is then also preferably appropriately indicated, for example as a fault or warning message on a display unit. However, it is also possible to execute a limited number of start/stop commands, that is to say to maintain start/stop operation to a limited extent. The start/stop command S-S-B can therefore be understood to be a start/stop check signal, wherein S3 then represents the actual start/stop command (yes or no).

It should be assumed that the evaluation in the control unit 9 has shown that there is a voltage difference, and therefore the switch 5 is open. The control unit 9 then further evaluates the level of the voltage difference. If said voltage difference is greater than the increase in the voltage at the output of the DC/DC converter 7, this means there is a dip in potential at KL30Z. The cause may be, for example, an interruption in the starter battery 2 or the supply line of the starter battery 2. In this case, the starter battery 2 cannot ensure the ability to restart said internal combustion engine. In this case, the control unit 9 generates a control signal S3 that the start/stop command is not executed. The switch 5 preferably remains open, so that retroactive effects of the defective starter battery 2 on the second region of the motor vehicle electrical system 1 are precluded. Furthermore, the control unit 9 also evaluates the time gradient of the potential KL30Z. If the control unit 9 detects a brief drop in the potential KL30Z, which then again increases the rated voltage of the starter battery 2, this may be an indication of an internal cell short-circuit in the starter battery 2 (when constructed from individual battery cells) or corrosion of a pole terminal. The start/stop command is not executed or is executed only to a limited extent in this case too. The switch 5 can likewise remain open.

If, in contrast, the evaluation shows that there is no defect in the starter battery 2, that is to say KL30−KL30Z≤ΔU, the control unit 9 generates a control signal S3 for executing a start/stop command, and the internal combustion engine is turned off.

The battery management module 10 detects the charging and discharging currents of the starter battery 2. As a result, the battery management module 10 can determine, for example, an internal resistance of the starter battery 2 and/or a state of charge (SOC) and/or a state of health (SOH) of the starter battery 2. In this case, it can be concluded that there is an internal cell short-circuit or similar fault, for example, on account of a change in the internal resistance. The battery management module 10 transmits a signal S4 to the control unit 9 in which individual parameters or all of the parameters of the starter battery 2 are taken into consideration. When making the decision as to whether a start/stop command should be executed or not, the control unit 9 can then take into account the information in the signal S4 and, for example, not execute said start/stop command if the internal resistance is greater than a threshold value.

In this case, the function of the diode 6 is not absolutely necessary for the method. However, the diode 6 ensures that the loads 8 are supplied with power if the DC/DC converter 7 and/or the second storage unit are/is defective.

Modem motor vehicles are increasingly being equipped with a start/stop function owing to the problem of $CO_2$ emissions during idling. With a start/stop function, the engine is switched off, for example when the vehicle has stopped at a stop light, in order to save fuel and to reduce $CO_2$ emissions. In order to continue driving, the engine is restarted by means of the starter. Since the starter draws current of up to 800 A for starting the motor, a voltage of up to 6 V is dropped across the internal resistor of the vehicle battery. The available terminal voltage in the electrical system therefore briefly falls to 12 V−6 V=6 V. In addition to the start/stop operation at stop lights, it is also already known to be able to switch off the engine (internal combustion engine) when said engine is not being used even the motor vehicle is moving ("freewheel engine off"; "start/stop on the move"). Restarting of the motor vehicle is ensured in any case.

DE 10 2008 054 885 A1 discloses an apparatus for controlling the supply of power to an electrical system of a vehicle, to which electrical system loads can be connected, comprising a first energy store for providing electrical energy to a starter, a generator for generating a generator voltage and a first controllable switching element which is provided between the first energy store and the generator and which is formed in such a way that it permits current flow only in one direction from the first energy store to the generator during operation of the vehicle. In this case, the switching element can also have a further switching state in which the switching element behaves in the manner of a conductor. The controllable switching element is preferably a field-effect transistor, in particular a MOSFET. Since field-effect transistors can be switched with low gate voltages and a minimal time delay, it is therefore possible to react quickly to changes in the current flow across the controllable switching element or severe voltage fluctuations in the electrical system. For example, a field-effect transistor or field-effect transistors which are connected in parallel can be arranged such that the forward direction of the intrinsic diode or diodes of said field-effect transistors corresponds to the direction from the first energy store to the generator. This ensures that, when the transistor is turned off, no current can flow from the generator to the first energy store. Secondly, even when the transistor is turned off, some of the current which flows from the first energy store to the electrical system can flow through the intrinsic diodes of the field-effect transistors. The apparatus further comprises a further energy store for providing electrical energy to the loads, said further energy store being arranged in such a way that the first controllable switching element is arranged between firstly the first energy store and secondly the generator and the further energy store. A charging circuit is also provided, wherein the charging circuit is formed, during operation of the vehicle, in such a way that the first energy store is charged to a voltage UE1 which is equal to or greater than the voltage of the second energy store UE2 and is lower than the voltage of the generator. The first energy store is preferably in the form of a double-layer capacitor and the second energy store is preferably in the form of a battery. The first energy store provides electrical energy to the starter for a warm start and/or damps voltage fluctuations through the load, wherein the second energy store provides electrical energy for the starter in the event of cold starting.

The invention is based on the technical problem of forming a motor vehicle electrical system of this generic type with a start/stop mode, and also of providing a method for operating a motor vehicle electrical system of this kind.

The technical problem is solved by the subjects having the features of patent claims 1 and 6. Further advantageous refinements of the invention can be found in the dependent claims.

To this end, the motor vehicle electrical system comprises a starter for an internal combustion engine and a first energy store, which starter and first energy store are arranged in a first region of the motor vehicle electrical system, and comprises a generator and a second energy store, which generator and second energy store are arranged in a second region of the motor vehicle electrical system, wherein a switching element is arranged between the first and the second region of the motor vehicle electrical system and has at least two switching states, wherein in a first switching state current flow is possible only in the direction from the first region to the second region or the current flow is interrupted in both directions, and in a second switching state the first and second region are connected-through to one another. In this case, the switching element can be actuated by at least one first associated control unit, wherein the second energy store is connected to the generator via a DC/DC converter.

A start/stop command for the internal combustion engine can be detected or can be identified by means of the control unit, wherein, when a start/stop command is detected or identified, the switching element is switched to the first switching state or a control command for switching to the first switching state is generated. The voltage at the DC/DC converter output, which is connected to the switching element, is increased by a (possibly second) control unit by means of a control command, wherein a measurement unit detects and evaluates the voltage across the switching element, wherein the start/stop command is executed by a (possibly third) control unit by means of a control command or is not executed, depending on the evaluation. As a result, it is possible to ensure, using simple means, that a start/stop command is executed only when the ability to restart the internal combustion engine is guaranteed and/or retroactive effects on the rest of the motor vehicle electrical system, in particular in the second region, are slight. According to the invention, the retroactive effects are prevented by the first switching state of the switching element. On account of the high starter current, dips in voltage may occur in the starter battery, and these would also lead to dips in voltage in the second region in the second switching state. Increasing the voltage at the output of the DC/DC converter has two effects. Firstly, the second region is further stabilized since the rectifying effect of the starter battery in the first switching state is dispensed with, this possibly leading to greater ripple of the voltage. Dips in voltage are compensated for by carefully increasing the voltage at the output of the DC/DC converter. Secondly, the temporary increase has the effect that, given proper functioning, a voltage difference across the switching element has to be dispensed with since the voltage at the output of the DC/DC converter is greater than the rated voltage of the starter battery.

On the basis of the voltage across the switching element, it is firstly possible to check whether the switching element is actually in the first switching state and whether the starter battery is able to restart the internal combustion engine. If the ability to restart said internal combustion engine is not ensured, the start/stop command is not executed.

In one embodiment, individual control units or all of the control units (first, second and third control unit) are integrated in a common control unit. Similarly, the measurement unit can be integrated in one of the control units or the one common control unit. In this case, the start/stop command can be generated either by the one control unit of the motor vehicle electrical system or by one of the control units of the motor vehicle electrical system or by a superordinate energy management system or an engine controller and transmitted to the control unit and detected by said control unit.

In a further embodiment, the switching element is in the form of a power semiconductor switch, power relay or in the form of a power relay with a parallel diode. In this case, the power semiconductor switch is, for example, in the form of a MOSFET or IGBT which each have at least one intrinsic diode. In this case, the diodes produce the directed current flow in the first switching state.

In a further embodiment, the voltage and/or the voltage gradient are/is detected and evaluated by the measurement unit. The nominal voltage is firstly a measure of whether the first switching state has been set at all since, when there is no voltage difference, this means that there is a through-connection (second switching state). In the case of relatively great voltage differences, it can be concluded that there is an interruption in the starter battery or the supply line of the starter battery. It can be concluded that there is, for example, an internal cell short-circuit in the starter battery or corrosion of a pole terminal using the gradient. In this case, the gradient relates to the change in the potential across the starter battery over time.

In a further embodiment, non-execution of a start/stop command is indicated, for example displayed on a display unit, so that the motor vehicle driver can prepare himself for the motor vehicle not being able to restart once it has been turned off.

In a further embodiment, the switching element is left in the first switching state in the event of a defect in the starter battery being established and the start/stop command not being executed.

In a further embodiment, a setpoint or rated voltage of the second energy store is greater than a setpoint or rated voltage of the first energy store (starter battery).

The first energy store can be in the form of, for example, a lead-acid battery or an Li-ion battery. The second energy store can be in the form of, for example, double-layer capacitors or Li-ion cells, wherein the latter are advantageous owing to their high energy density.

The invention claimed is:
1. A motor vehicle electrical system comprising:
a starter for an internal combustion engine and a first energy store, which starter and first energy store are arranged in a first region of the motor vehicle electrical system;
a generator and a second energy store, which generator and second energy store are arranged in a second region of the motor vehicle electrical system;
a switching element arranged between the first and the second region of the motor vehicle electrical system, the switching element having at least two switching states, wherein, in a first switching state, current flow is possible only in a direction from the first region to the second region or the current flow is interrupted in both directions, and, in a second switching state, the first and second region are connected-through to one another so that current flow in the direction from the first region to the second region and from the second region to the first region are possible, wherein the switching element is actuated by at least one associated control unit based on a first control signal, wherein the second energy store is connected to the generator via a DC/DC converter, wherein a start/stop command (S-S-B) for the internal combustion engine is detected or identified by the at least one associated control unit, wherein, when a start/stop command is detected or identified, the switching element is switched to the first switching state and the voltage at the DC/DC output, which is connected to the switching element, is increased by the control unit based on a second control command, wherein a measurement unit detects and evaluates the voltage across the switching element, wherein the start/stop command is executed by the at least one associated control unit based on a third control command or is not executed, depending on the evaluation.

2. The motor vehicle electrical system of claim 1, wherein the at least one associated control unit is one of a plurality of control units integrated in a common control unit.

3. The motor vehicle electrical system of claim 1, wherein the switching element is a power semiconductor switch, a power relay or a power relay with a parallel diode.

4. The motor vehicle electrical system of claim 1, wherein the measurement unit detects and evaluates the voltage and/or the voltage gradient.

5. The motor vehicle electrical system of claim 1, wherein a setpoint voltage of the second energy store is greater than a setpoint voltage of the first energy store.

6. A method for operating a motor vehicle electrical system, wherein the motor vehicle electrical system includes a starter for an internal combustion engine and a first energy store, which starter and first energy store are arranged in a first region of the motor vehicle electrical system, and a generator and a second energy store, which generator and second energy store are arranged in a second region of the motor vehicle electrical system, wherein a switching element is arranged between the first and the second region of the motor vehicle electrical system and has at least two switching states, wherein in a first switching state current flow is possible only in the direction from the first region to the second region or is interrupted in both directions, and in a second switching state the first and second region are connected-through to one another so that current flow in the direction from the first region to the second region and from the second region to the first region are possible, wherein the switching element is actuated by at least one associated control unit based on a control command, the method comprising:

connecting the second energy store to the generator via a DC/DC converter;

detecting or identifying a start/stop command for the internal combustion engine by the at least one associated control unit;

switching the switching element to the first switching state and increasing the voltage at the DC/DC output, which is connected to the switching element, by the at least one associated control unit based on a second control command when a start/stop command is detected or identified;

detecting and evaluating, using a measurement unit, the voltage across the switching element; and executing the start/stop command by the at least one associated control unit based on a third control command or not executing the start/stop command, depending on the evaluation.

7. The method of claim 6, wherein the voltage is used to establish whether the switching element has been switched to the first switching state.

8. The method of claim 6, wherein the measurement unit detects and evaluates the voltage and/or the voltage gradient, wherein an interruption in the first energy store or the supply line of the first energy store is detected using the voltage and/or an internal cell short-circuit and/or corrosion of a pole terminal is detected using the voltage gradient.

9. The method of claim 6, wherein non-execution of a start/stop command is indicated.

10. The method of claim 6, wherein the switching element remains in the first switching state when a defect in the starter battery is established and the start/stop command is not executed.

\* \* \* \* \*